April 21, 1925.

J. A. BROGAN 1,534,257

HEEL TRIMMING MACHINE

Filed June 21, 1922  2 Sheets-Sheet 1

INVENTOR.
James A. Brogan

April 21, 1925.

J. A. BROGAN 1,534,257

HEEL TRIMMING MACHINE

Filed June 21, 1922   2 Sheets-Sheet 2

INVENTOR
James A. Brogan
By his Attorney
Nelson W. Howard

Patented Apr. 21, 1925.

1,534,257

UNITED STATES PATENT OFFICE.

JAMES A. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

HEEL-TRIMMING MACHINE.

Application filed June 21, 1922. Serial No. 569,800.

*To all whom it may concern:*

Be it known that I, JAMES A. BROGAN, a citizen of the United States, residing at Lawrence, in the county of Essex and State of Massachusetts, have invented certain Improvements in Heel-Trimming Machines, of which the following description, in connection with the accompanying drawings, is a specification, like reference characters on the drawings indicating like parts in the several figures.

This invention relates to trimming machines and is herein illustrated as embodied in a machine for trimming the overflow from molded and vulcanized rubber heels.

Such heels are made by placing blanks of unvulcanized rubber or rubber compound in molds and subjecting the mto heat and pressure. In order to insure that the molds shall be completely filled, the blanks are made a little oversize. Consequently, during the subjection of the blanks to heat and pressure, more or less rubber overflows into the spaces between the parts of the mold, and at the end of the operation this overflow has become thin lips or fins of vulcanized rubber which project from the top and bottom edges of the heel. A type of rubber heel which has gone into wide use comparatively recently is concave on the heel seat face and convex on the tread face, the heel as a whole being thus concavo-convex; and the variously curved edges and faces which are present in such a heel have introduced difficulties into the trimming operation.

The general object of the present invention is to provide an improved trimming machine which is suitable for operating upon this and other types of rubber heels and similar articles.

The illustrative machine comprises a pair of co-operating rotary disk cutters located one above the other and a table over which the work is fed to the cutters. In order to guard the work from injury as well as to facilitate the presentation and feeding of the work, two guards are provided, an idly mounted hollow guard which extends over the upper cutter and a driven one which extends above the periphery of the lower cutter in position to be engaged by the under side of the work.

These and other features of the invention, including certain details of construction and combinations of parts, will be described as embodied in an illustrative machine and pointed out in the appended claims.

Referring now to the accompanying drawings.

Figure 1:
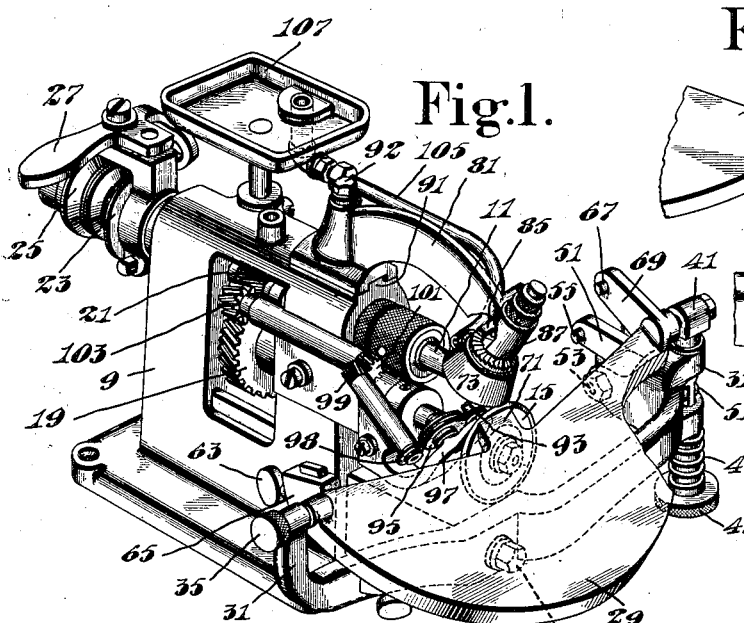
Figure 1 is a perspective of a machine in which the present invention is embodied.

Mounted in the frame 9 of the machine is a driving shaft 11, said shaft having fast to its outer end a disk cutter 13 of small diameter arranged to cooperate so as to produce a shear cut with a cutter 15 of larger diameter, fast to the outer end of a shaft 17. Fast to the inner end of the shaft 17 is a spiral gear 19 which meshes with a smaller spiral gear 21 on the driving shaft so that both cutters are driven at approximately the same peripheral velocity, the driving shaft 11 having at its inner end the usual fast and loose pulleys 23, 25 from one to the other of which a belt (not shown) may be moved by a belt shifter 27.

Figure 3:
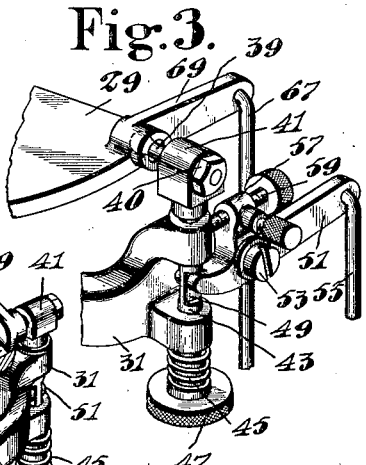
Fig. 3 is a perspective of the mechanism for raising and lowering the work table.

Located in front of the cutters is a work support in the form of a table 29. The near end of the table, as viewed in Fig. 1, is supported by an upturned end of a bar 31, the bar extending across one end of the machine and being fastened to the frame by a screw bolt 33. Through the upper end of the upturned end of the bar is threaded a pivot screw 35 the enlarged rounded head on the inner end of which is received in a suitable socket formed in a boss on the table, the outer end of the screw having a nurled head. The remote end of the table 29 (see Fig. 3) is also supported by the bar 31 but in such a manner that this end of the table may be raised and lowered with respect to the bar. A screw 39, similar to the screw 35, has a rounded end which is received, like the rounded end of the screw 35, in a suitable socket in the table. The screw 39, however, is not mounted directly in the bar 31 but is threaded through a boss 41 formed at the upper end of a rod 43 which is vertically slidable in alined bores formed in lugs which are integral with the bar 31, the screw 39 being held in position by a nut 40. A spring 45, bearing at its upper end against one of the lugs and at its lower end against a thumb-nut 47, threaded on the rod 43, tends at all times to pull the rod, and with it the screw 39, downwardly. In order to limit this downward movement, as well as to provide means for raising the rod when desired, a flattened portion 49 on the rod is received in the slotted end of a lever 51 pivoted near its middle at 53 to the bar 31 and at its end to the upper end of a treadle-rod 55. Rising from the lever 51 is a lug 57 through which is threaded a set screw 59 the end of which contacts with the upper one of the lugs on the bar 31. The spring 45 normally holds the table down in the position shown with the end of the set screw 59 in contact with the lug on the bar 31; and when it is desired to raise the table, a treadle (not shown), which is connected to the lower end of the treadle-rod 55, is depressed. The purpose of this construction, which permits the work table to be raised and lowered, is to facilitate proper presentation of the work. If, for example, the work table is in position to present the fin on the concave face of a heel to the bite of the cutters and then the heel is turned over on its convex face, the fin on that face will be located partly or wholly above the bite of the cutters. And the same difficulty may be encountered when there are projections on the tread face of a heel such as the raised rings which commonly encircle the nail holes. With the construction described above the operator may raise or lower the work table, and with it the heel or other piece of work, while the machine is running so as to present the work properly to the cutters.

Figure 2:
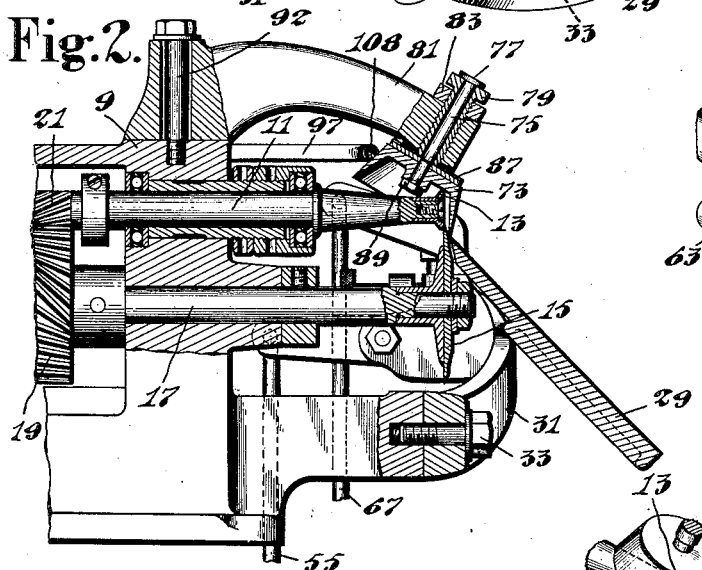
Fig. 2 is a medial longitudinal section through one end of the machine.
Figure 4:
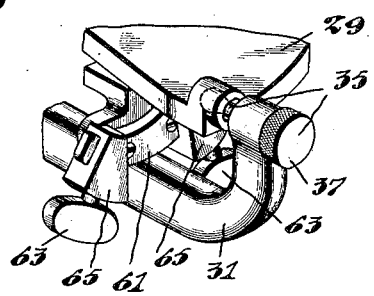
Fig. 4 is a perspective showing the manner in which the extent of angular movement of the work table is limited.

The screws 35 of the work table 29 are in alinement, their common axis passing through a point which lies very close to and is substantially coincident with the locality in which the cutters meet. In order to limit the extent to which the table may swing in either direction about this axis, the table carries on its under side a segmental bar 61 which is located above the cross-bar 31; and on each end of the segmental bar there is adjustably fastened by a set screw 63 a block 65. By adjusting the blocks 65 into different positions on the bar 61, the limits of swinging movement of the table may be varied. Ordinarily two angular positions are used in trimming a heel, the blocks being set for these two positions. The weight of the table normally holds it in the angular position shown in Figs. 1 and 2. When it is desired to tilt the table up into the position shown in Fig. 5, a treadle (not shown) is depressed, said treadle being connected to the lower end of a treadle-rod 67, the upper end of which is pivoted to an arm 69 which is integral with the table. The table is cut away in two localities on that edge which is adjacent the cutters to form a projection 71 so that, when the concavely curved breast edge of the heel is encountered, the heel may be rocked on the projection, and the fin properly presented to the cutters.

It is essential in machines of this type that no cutting into the heel itself shall occur. In order to prevent the upper cutter from doing this, as well as to aid the operator in presenting the work, a guard is provided having a portion extending in front of said cutter. As shown this guard is a hollow thin-edged, conical member 73 fast to the lower end of an inclined stem 75 having a head 77. The stem is free to rotate in a bushing 79 which contacts with the under side of the head 77 and is threaded into the outer end of an arm 81. The bushing may be turned to adjust the guard 73 and may be held in adjusted position by a lock-nut 83. This guard is not driven but turns idly as the heel is fed in contact with it over the table. In order to permit the guard to be rotated in a forward direction and to prevent it from being rotated in the opposite direction, a pawl 85, pivoted on the arm 81, engages teeth arranged in a circle on a plate 87 which is held rigid with the guard by the nut 89 which holds the guard on the end of the stem 75. The arm 81 has integral with it a base which has a guideway in its lower portion to receive a guide rib 91 formed on the frame of the machine. The arm 81, and with it the hollow guard 73, may thus be adjusted in a direction parallel to the axis of the shaft 11 of the upper cutter. In order to hold the arm in adjusted position, a vertical bore is provided through the base of the arm to receive a screw bolt 92, the diameter of the bore being greater than that of the bolt.

Figure 7:
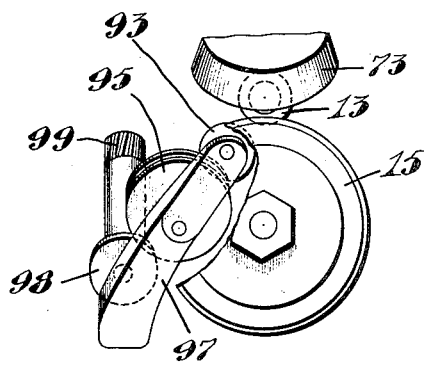
Fig. 7 is an end elevation of a portion of the machine showing more particularly the relation of the lower guard to the lower cutter.
Figure 8:
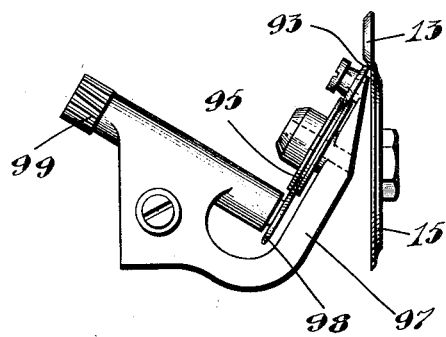
Fig. 8 is a side elevation of the parts shown in Fig. 7.

In presenting a heel to the cutters and in feeding it to them, a portion of the heel is located above the lower cutter. In order to prevent this portion of the heel from being accidentally cut as well as to aid the operator in feeding the heel, a rotary guard and feed member in the form of a small roll or wheel 93 extends up above the periphery of the lower cutter at a locality in advance of that in which the cutters engage the work. This wheel is driven frictionally by two friction disks 95 idly mounted on a spindle formed on an arm 97 which is rigid with the frame of the machine. The friction disks 95 receive between them a portion of the margin of the wheel 93; and, at a locality diametrically opposite on the friction disks, they receive between them a portion of the margin of a driving disk 98. This latter disk is fast to the lower end of a downwardly inclined shaft mounted in a bearing which is rigid with the frame of the machine, the upper end of the shaft carrying a spiral gear 99 which meshes with a spiral gear 101. The latter gear is fast to the outer end of a horizontal shaft rotatably mounted in the frame, the inner end of the shaft having a spiral gear 103 which meshes with the gear 19. The wheel 93 is mounted upon a spindle carried by the same arm 97 which carries the spindle of the friction disks 95, and its axis is inclined downwardly and toward the front of the machine. It will be seen, therefore, as best shown in Figs. 7 and 8, that the plane of the wheel 93 is at an angle to the plane of the cutter 15 and that, as the heel is fed over the table 29 to the cutters, the wheel 93 contacts both with the under face of the heel 100 and with the under face of the overflow or fin 200. In addition to aiding in the feed of the heel, it serves both to prevent the under face of the heel from being injured by the lower cutter 15 and to support the severed portion of the fin.

In order to lessen the friction between the hollow guard 73 and the work, means are provided for supplying lubricant to the work-engaging face of the guard. To this end a pipe 105 leads from a receptacle for lubricant 107 to a point in proximity to the surface of the guard and carries in its end a piece of absorbent material 108, such as felt, which it holds in contact with the guard.

Figures 5, 6:
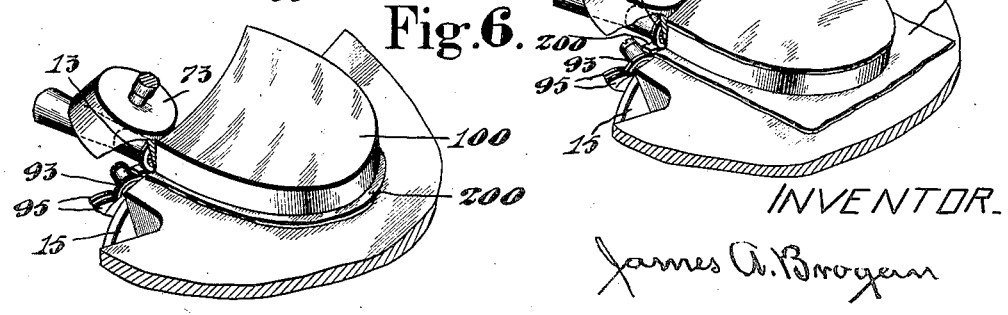
Fig. 5 is a perspective showing the machine trimming the fin from the concave face of a heel.
Fig. 6 is a similar view with the fin being trimmed from the convex face.

In the operation of the machine the heel, assuming it to be of the concavo-convex type, may be presented first with its concave face resting upon the table, as shown in Fig. 5, and trimmed all the way around and then turned over into the position shown in Fig. 6 and again trimmed all the way around. If there is still left a remnant of a fin along one or both edges of the breast, the rear end of the heel may be raised and the breast edge or edges trimmed more closely by rocking the heel about the projection 71. During the trimming operation the treadles may be manipulated as desired either to vary the angular inclination of the table or to raise it.

A machine for performing the same sort of work as the present one is shown and described in prior application Ser. No. 507,- 195, filed in my name; and all the subject-matter common to the two applications is claimed in the prior one.

Having thus described my invention, what I claim as new and desire to secure by Letters Patent of the United States is:—

1. A machine for trimming a fin from a molded rubber heel or similar article having, in combination, a rotary disk cutter, a support over which the work may be presented to the cutter, means for rotating the cutter and an idly-mounted, rotatable, thin-edged guard having its work-engaging portion extending in front of the cutter whereby a face of the article may be held against the guard and so fed as to cause the fin to be severed substantially flush with said face.

2. A machine for trimming the overflow which projects from a molded rubber heel or similar article having, in combination, a pair of cooperating rotary disk cutters, a work support having a portion located adjacent to the cooperating portions of the cutter and an idly-mounted, rotatable, thin-edged, hollow guard extending in front of the cutter whereby a face of the article may be held against the guard and so fed as to cause the fin to be severed substantially flush with said face.

3. A machine for trimming a fin from a molded rubber heel or similar article having, in combination, a rotatable disk cutter, means for rotating the cutter, a work supporting table over which the work may be fed to the cutter, said table being angularly adjustable about an axis which passes close to the work-engaging portion of the edge of the cutter, an idly-mounted, rotatable, thin-edged, hollow guard extending over the cutter, whereby a face of the article may be held against the guard and so fed as to cause the fin to be severed substantially flush with said face, and a pawl and ratchet device for preventing the guard from rotating in one direction.

4. A machine for trimming a fin from a molded rubber heel or similar article having, in combination, a pair of co-operating rotary shear cutters, means for rotating the cutters, a work support located in front of the cutters, said work support being angularly adjustable about an axis extending at an angle to the axes of the cutters and passing substantially through the locality in which the cutters meet, and an idly mounted rotatable thin-edge hollow guard extending over one of the cutters whereby a face of the article may be held against the guard and so fed as to cause the fin to be severed substantially flush with said face.

5. A machine for trimming a fin from a molded rubber heel or similar article having, in combination, a pair of co-operating rotary shear cutters, means for rotating the cutters, a work support located in front of the cutters, said work support being angularly adjustable about an axis extending at an angle to the axes of the cutters and passing substantially through the locality in which the cutters meet, an idly mounted rotatable thin-edged hollow guard extending over one of the cutters, whereby a face of the article may be held against the guard and so fed as to cause the fin to be severed substantially flush with said face, and means for preventing the guard from being rotated in one direction.

6. A machine for trimming the overflow which projects from a molded rubber heel or similar article having, in combination, a pair of co-operating rotary cutters, a work support located on one side of the cutters, and a guard for one of the cutters, said guard comprising a roll located on the other side of the cutter from the work support and extending beyond the periphery of the cutter in position to be engaged by one side of the work before the work is operated upon by the cutters.

7. A machine for trimming the overflow which projects from a molded rubber heel or similar article having, in combination, a pair of co-operating rotatable cutters located one above the other, means for rotating the cutters, a guard for the upper cutter, and a guard for the lower cutter, said last-named guard comprising a roll extending above the periphery of the lower cutter in position to be engaged by the under side of the work before the work is operated upon by the cutters.

8. A machine for trimming the overflow which projects from a molded rubber heel or similar article having, in combination, a pair of co-operating rotatable cutters located one above the other, means for rotating the cutters, a guard for the upper cutter, a guard for the lower cutter, said last-named guard comprising a roll extending above the periphery of the lower cutter in position to be engaged by the under side of the work before the work is operated upon by the cutters, and means for rotating the roll in a direction to assist in feeding the work.

9. A machine for trimming the overflow which projects from a molded rubber heel or similar article having, in combination, a pair of co-operating rotatable cutters located one above the other, a guard for the upper cutter and a guard for the lower cutter, said last-named guard comprising a roll the axis of which is oblique to those of the cutters, and means for rotating the roll.

10. A machine for trimming the overflow which projects from a molded rubber heel or similar article having, in combination, a pair of co-operating rotatable cutters located one above the other, a hollow rotatable guard for the upper cutter and a guard for the lower cutter, said last-named guard comprising a roll the axis of which is oblique to those of the cutters, and means for rotating the roll.

11. A machine for trimming the overflow which projects from a molded rubber heel or similar article having, in combination, a pair of co-operating rotary cutters, a work table angularly adjustable about an axis which substantially passes through the locality in which the cutters meet, treadle-controlled means for adjusting the table about said axis, and treadle-controlled means for raising the table.

12. A machine for trimming the overflow which projects from a molded rubber heel or similar article having, in combination, a pair of co-operating rotary cutters, a work support located on one side of the cutters, a guard for one of the cutters located on the other side of the cutters from the work support and extending beyond the periphery of the cutter in position to be engaged by one side of the work before the work is operated upon by the cutters, and means for driving the guard in a direction to aid in feeding the work.

In testimony whereof I have signed my name to this specification.

JAMES A. BROGAN.